R. K. BLODGETT.
ANIMAL MUZZLES.

No. 179,889.　　　　　　　Patented July 18, 1876.

WITNESSES:　　　　　　INVENTOR:
Gustav Dieterich　　　　R. K. Blodgett
John Goethals　　　　BY
　　　　　　　　　　ATTORNEYS.

UNITED STATES PATENT OFFICE.

RUFUS K. BLODGETT, OF MORRISON, ILLINOIS, ASSIGNOR TO HIMSELF AND HENRY M. MYERS, OF SAME PLACE.

IMPROVEMENT IN ANIMAL-MUZZLES.

Specification forming part of Letters Patent No. 179,889, dated July 18, 1876; application filed May 22, 1876.

*To all whom it may concern:*

Figure 1:
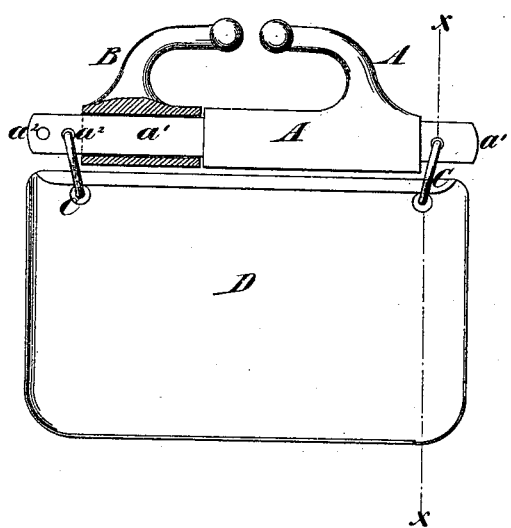
Figure 2:

Be it known that I, RUFUS K. BLODGETT, of Morrison, in the county of Whitesides, and in the State of Illinois, have invented a new and Improved Animal-Muzzle, of which the following is a specification:

Figure 1 is a front view of my improved device, partly in section, to show the construction. Fig. 2 is a cross-section of the same, taken through the line $x\ x$, Fig. 1.

The object of this invention is to furnish an improved muzzle for calves and other animals, to prevent them from sucking other animals or themselves, and which shall be simple in construction, effective in use, not liable to come off, and easily adjusted to larger or smaller animals, as may be desired.

The invention consists in the combination, with each other, of the part provided with a knobbed arm, and having a short perforated tenon upon its outer end, and a long tenon with two or more holes upon its inner end, the part provided with a knobbed arm, and having a hole or socket through its base, the open rings or links, and the plate having its upper edge turned over, as hereinafter fully described.

A and B are the parts of the clasp which have arms formed upon their upper sides, and curved upward and inward, so that their ends may nearly meet, and have knobs upon their ends to rest against the opposite sides of the cartilage of the animal's nose. Upon the ends of the base of the part A are formed tenons $a^1$. The outer tenon $a^1$ is short, and has a hole formed in it to receive the ring C, which also passes through a hole in the upper corner of the plate D. The other tenon $a^1$ is made long, to pass through a hole or socket in the base of the other part, B, and has a hole, $a^2$, formed through it at the outer end of the base of the part B, to receive the ring C, which also passes through the corner of the plate D. Several holes, $a^2$, are formed through the tenons $a^1$, to receive the ring C, so that the parts A B of the clasp may be adjusted to the nose of a larger or smaller animal, as may be desired.

The rings or links C are open, so that they may be spread apart for convenience in applying the device to the animal's nose.

The plate D has its upper edge turned over, as shown in Figs. 1 and 2, to strengthen it, and its lower and side edges may be bent or curved a little, as shown in Figs. 1 and 2.

Having thus described my invention, what I claim as new, and desire to secure by Letters Patent, is—

The combination of the part A, provided with a knobbed arm, and having a short perforated tenon upon its outer end, and a long tenon with two or more holes upon its inner end, with the part B, provided with a knobbed arm, and having a hole or socket through its base, the open rings or links C, and the plate D, having its upper edge turned over, substantially as herein shown and described.

RUFUS K. BLODGETT.

Witnesses:
FRANK FOX,
H. M. MYERS.